United States Patent [19]
McCrory et al.

[11] Patent Number: 5,388,791
[45] Date of Patent: Feb. 14, 1995

[54] UNIVERSAL CLIPPING RETAINER

[75] Inventors: Anthony J. McCrory, Mechanicsburg; Phillip E. Smith, Urbana, both of Ohio

[73] Assignee: Navistar International Transportation Corp., Chicago, Ill.

[21] Appl. No.: 50,939

[22] Filed: Apr. 21, 1993

[51] Int. Cl.⁶ .............................................. F16L 3/22
[52] U.S. Cl. ...................... 248/68.1; 24/543; 24/563; 248/74.3
[58] Field of Search ............... 248/68.1, 74.3, 74.2, 248/73, 231.8, 74.1; 24/543, 563

[56] References Cited

U.S. PATENT DOCUMENTS

| | | | |
|---|---|---|---|
| 2,278,691 | 4/1942 | Cotter | 248/68.1 X |
| 3,494,580 | 2/1970 | Thorsman | 248/68.1 |
| 4,707,906 | 11/1987 | Posey | 248/74.2 X |
| 4,913,386 | 4/1990 | Sugiyama | 248/74.2 X |
| 5,020,749 | 6/1991 | Kraus | 248/74.2 X |
| 5,042,114 | 8/1991 | Parrish | 248/74.3 X |

FOREIGN PATENT DOCUMENTS 0049206  6/1992  European Pat. Off. ............. 24/543

OTHER PUBLICATIONS

"GB Quality Electrical Products" Catalog No. AD-240R GB Electrical, Inc., 1992, pp. 173, 204–205.

*Primary Examiner*—Ramon O. Ramirez
*Attorney, Agent, or Firm*—Dennis K. Sullivan

[57] ABSTRACT

The universal clipping retainer for engaging a bundle of tubular elements to a frame rail flange of a vehicle comprises first and second sections. The first section comprises structure to which a tubular bundle is engaged by means of a cable tie strap member, the strap member extending through openings in the section, extending around the bundle and engaging to itself. The second section is a clip engaged to one end of the first section, the clip comprising a plurality of fingers biased toward a centerline of the clip for engaging a frame rail flange therebetween, each of the fingers having barbs on a flange engaging surface thereof, with the barbs pointing away from free ends of the fingers.

9 Claims, 3 Drawing Sheets

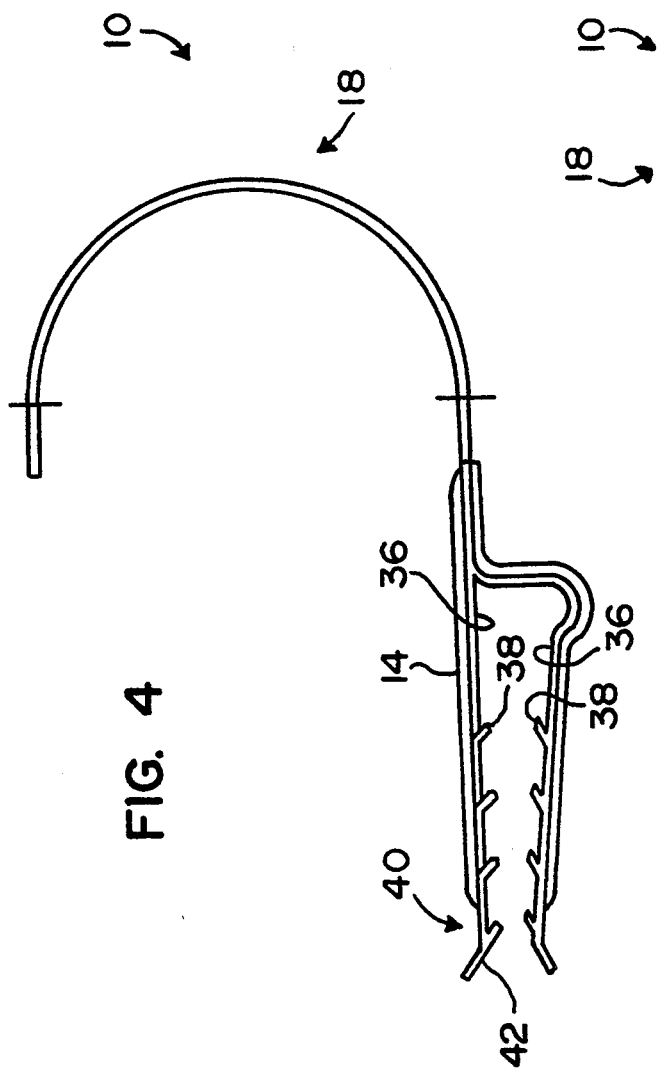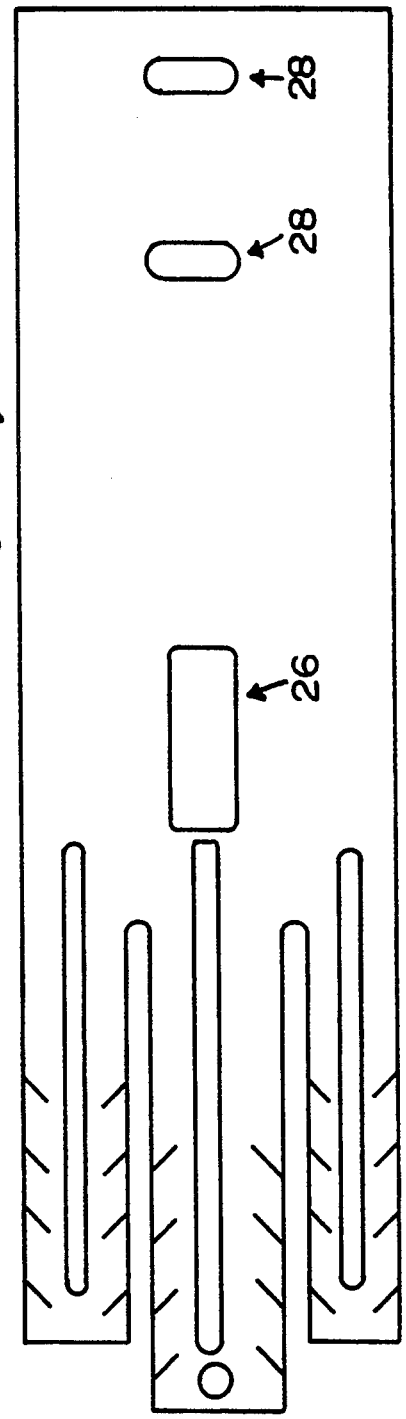

UNIVERSAL CLIPPING RETAINER

BACKGROUND OF THE INVENTION

The present invention relates to a universal clipping retainer which is particularly adapted to engage a frame rail flange of a vehicle such as a truck, the flange being slightly wedge shaped and the retainer being engageable thereto by merely pushing it onto the flange. The retainer being able to withstand three gravities of force load to prevent disengagement when the vehicle travels over rough, bumpy terrain. More specifically, the retainer includes resilient flange grasping fingers which are provided with angled barbs thereon for resisting displacement of the retainer on the flange.

THE PRIOR ART

Heretofore, various clamping assemblies have been used in vehicles such as trucks for routing and clipping elongate tubular elements such as brake lines, wiring harnesses, hydraulic lines, etc. along the frame rails from a rear portion of the vehicle chassis to an engine compartment thereof.

Since the frame rails of trucks are typically C-shaped channel sections which have wedge-shaped frame rail flanges, a problem has been encountered in attempting to create a clamping assembly or clipping retainer which can be simply and quickly engaged onto the flanges. Typically, such retainer would necessarily have to be fixed to the flange by bolts or screws and the like, requiring a significant time and labor investment to create the holes necessary for such engagement, to produce such engagement, and in replacement as well if such is required. Additionally, it is considered to be bad engineering practice to drill holes in frame rail flanges.

As will be described in greater detail hereinafter, the universal clipping retainer of the present invention obviates the need for such time and labor investment.

SUMMARY OF THE INVENTION

It is a primary object of the present invention to provide a universal clipping retainer which may be easily installed on a wedge-shaped frame rail flange without mechanical locking or clamping means and which will maintain engagement therewith even under severe service conditions such as when the vehicle is travelling over extremely rough, bumpy terrain.

It is a further object to produce a retainer which may be quickly and easily replaced.

These and other objects are met by the universal clipping retainer of the present invention, the retainer including a substantially elongate member having one end which coacts with a strap to engage a tubular element or a bundle of such element and having a generally U-shaped clamping end defining a plurality of opposed gripping fingers thereon, the fingers being barbed to engage the wedge-shaped flange surfaces to ensure an engagement which will endure during passage of the vehicle over rough, bumpy terrain.

BRIEF DESCRIPTION OF DRAWINGS

Other objects and advantages of the invention will become more apparent upon perusal of the detailed description thereof and upon inspection of the drawings in which:

FIG. 4 is a side view of a further embodiment of the clipping retainer;

FIG. 5 is a top plan view of the retainer of FIG. 4;

DESCRIPTION OF THE PREFERRED EMBODIMENT

Figure 3:
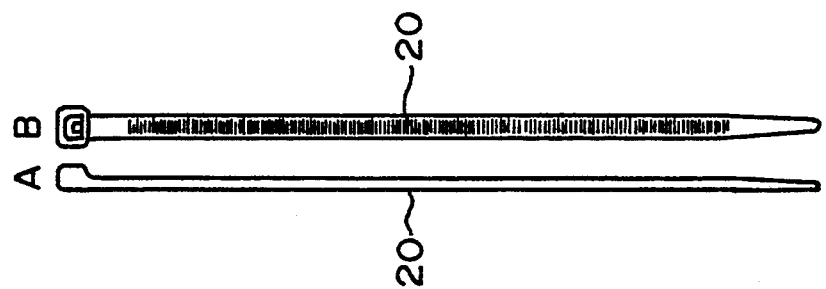
FIGS. 3A and 3B are a side and top plan view, respectively, of a strap used with the retainer.
Figure 2:
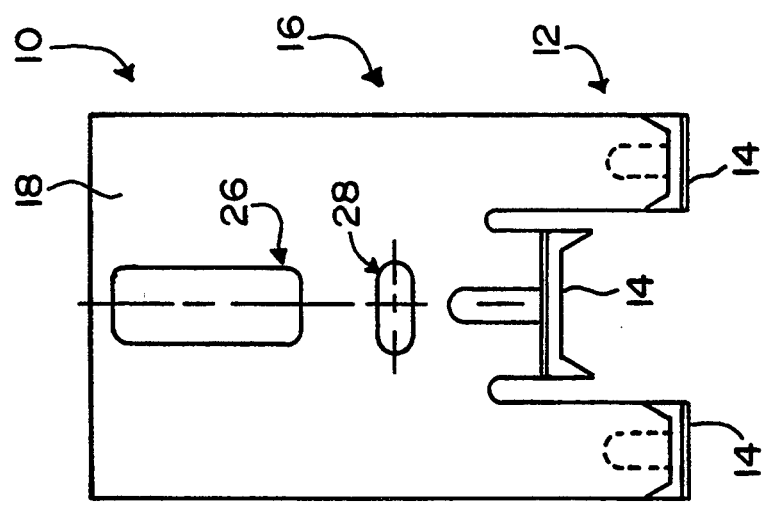
FIG. 2 is a top plan view of the retainer of FIG. 1.
Figure 1:
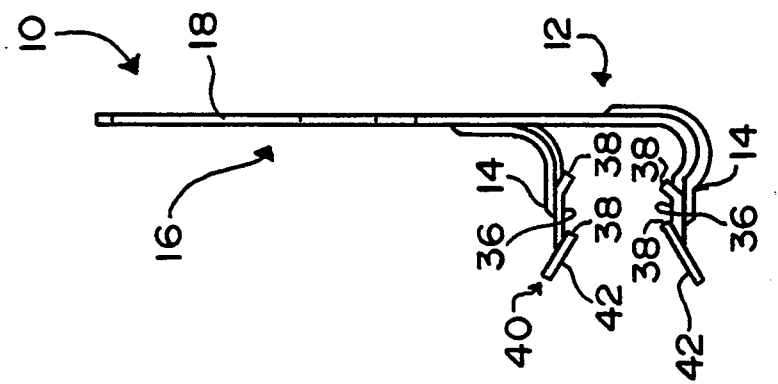
FIG. 1 is a side view of a preferred embodiment of the universal clipping retainer of the present invention.

Referring now to the drawings in greater detail, there is illustrated therein the universal clipping retainer of the present invention generally identified by the reference numeral 10.

Figure 6:
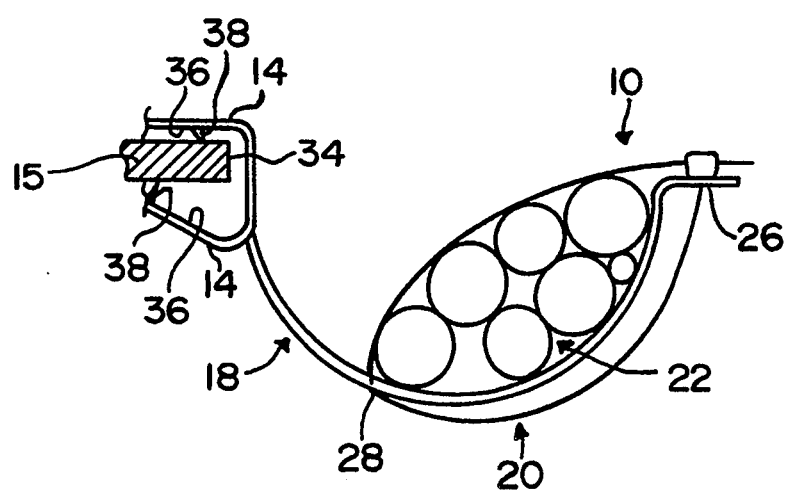
FIG. 6 is a side view of a further embodiment of a retainer shown engaged to a wedge-shaped frame rail flange of a truck.
Figure 7:
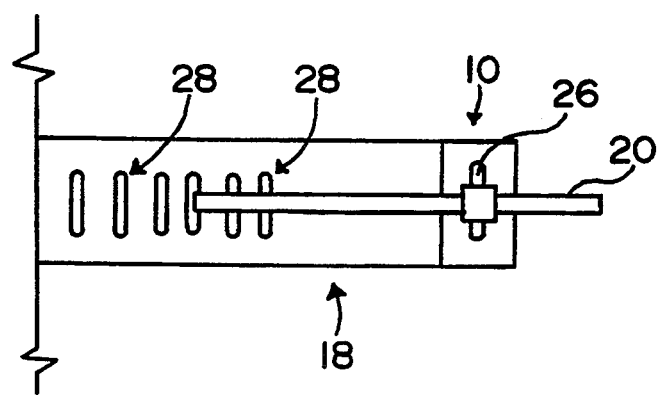
FIG. 7 is a top plan view of a portion of the retainer of FIG. 6.

The retainer 10 is seen to comprise two sections. A first generally U-shaped clamping section 12 defined by a plurality of upper and lower fingers 14, 14' thereon which cooperate to engage a frame rail flange 15 (FIG. 6) therebetween. A second retainer section 16 includes a tubular bundle engaging arm 18 which is adapted to have a conventional plastic cable tie 20 mounted thereto, securing a tubular bundle 22 (FIG. 6) to the arm 18. The retainer section 16 may take on any of several configurations, some being shown in the drawings, depending on the requirements of the application.

Each configuration of the arm 18, however, has provided therein at least two openings 26, 28 through which the cable tie 20 may be run, with the cable tie encasing the bundle 22 and being fixable to itself in a known manner. Of course other means of attaching the bundle 22 to the arm 18 may also be used.

Returning now to the first section 12 of the retainer 10, it will be seen that the fingers 14,14' are biased toward one another and a centerline of the section 12, to be capable of grasping the flange 15 therebetween, which is seen to be slightly wedge shaped, thickening toward the frame rail (not shown) from which it extends. Because of this thickening, or wedge shape, of the flange 15, the fingers 14 must be formed in a manner where they will not slip toward the thinner end edge 34 of the flange 15, causing disengagement of the retainer 10 therefrom.

To overcome the tendency toward slippage, the fingers 14, on the coacting gripping surfaces 36 thereof, are provided with a plurality of barbs or teeth 38. These barbs 38 are angled on the gripping surfaces 36 to point toward the thinner end edge 34 of the flange 15, creating an increased frictional force to resist motion of the fingers 14 toward the end edge 34 of the flange 15 which might be caused, for example, by vibrational or jolt forces on the flange 15, such forces increasing to as much as three times gravity when a truck encounters rough terrain, passing over "bumps" in the road.

The frictional force created by the barbs 38 must therefore be substantial enough to overcome the tendency of the retainer 10 to slip off the flange 15 at times of such increased forces being applied. It has been found through empirical testing that the provision of the barbs 38 nicely accommodates the periods of increased force, maintaining engagement of the retainer 10 on the flange 15.

It will be understood that the retainer 10 is formed from a blank of steel stock, with the upper finger 14 being laterally offset centrally between the lower fingers 14' to provide clamping of the flange therebetween. Barbs 38 extend substantially across the width of the fingers 14 and 14', the barbs 38 being formed by upsetting portions of the fingers 14,14' away from the surface so that the barbs 38 point toward the end edge 34 of the flange 15, thus creating barbs 38 which lean into the metal of the flange 15 in a direction toward the end edge 34 of the flange 15.

Also, each of the fingers 14,14' at a free end 40 thereof is provided with an oppositely outwardly extending flange portion 42 to ease engagement of the retainer 10 onto the flange 15 or other such structure. Hence, the retainer 10 may simply be forced onto the flange 15 or tapped onto the flange 15 with a rubber mallet (not shown).

To produce the desired flange grasping capability, as well as to produce a retainer 10 which will withstand effects of the ambient environment, the retainer 10 is made of annealed steel and coated with a vinyl compound. Likewise, the cable tie strap 20 to be used in conjunction with the retainer 10 will be formed from a material such as plastic which can stand up to the elements.

As described above, the clipping retainer 10 of the present invention provides a number of advantages, some of which have been described above and others of which are inherent in the invention. Also modifications can be proposed to the retainer 10 without departing from the teachings herein. Accordingly the scope of the invention is only to be limited as necessitated by the accompanying claims.

We claim:

1. A universal clipping retainer for engaging at least one elongated tubular element to a frame rail flange of a vehicle, the retainer comprising first and second integrally connected sections, said first section comprising structure to which a tubular element is engaged by means of a strap member, the strap member extending through a plurality of openings in the section, extending around the tubular element and engaging to itself, and said second section being a clip comprising a plurality of fingers defining in profile a U-shaped structure, said fingers biased toward each other and toward a centerline of the clip for engaging a wedge-shaped frame rail flange therebetween, each of said fingers having barbs on a flange engaging surface thereof, with the barbs pointing away from free ends of the fingers.

2. The retainer of claim 1 wherein said retainer is folded from a sheet of annealed steel.

3. The retainer of claim 2 wherein said steel is coated with vinyl.

4. The retainer of claim 3 wherein said fingers are partially upset to produce a plurality of barbs on adjacent gripping surfaces thereof.

5. The retainer of claim 4 wherein free ends of said fingers are each provided with flange portions which point away from one another about a centerline therebetween.

6. The retainer of claim 5 wherein said strap member is a cable tie made of plastic.

7. In combination with a vehicle frame rail having a wedge-shaped flange, a plurality of clipping retainers disposed along said flange, each retainer engaging a bundle of tubular elements to said flange of said frame rail, each of said retainers comprising a clip having cooperating flexible fingers which engage the wedge-shaped flange therebetween, the fingers having frictional barbs on flange-engaging surfaces thereof which engage said flange in a direction angled from said surfaces away from the open end defined by said fingers to fix the retainer in place on said flange, and retaining means securing a bundle of tubular elements disposed on the retainer.

8. The retainer of claim 7 wherein free ends of said fingers are each provided with flange portions which point away from one another about a centerline therebetween.

9. The invention in accordance with claim 7 wherein said clip comprises a plurality of openings therethrough, said openings being spaced from and aligned perpendicularly to said flange engaging surfaces, and said retaining means comprises a plastic cable tie extending through said openings and around said bundle of tubular elements.

* * * * *